(No Model.)

L. FLEISCHMAN.
NUT LOCK.

No. 590,412.  Patented Sept. 21, 1897.

Witnesses:  Inventor: Louis Fleischman,
W. J. Sankey,
Reuben G. Orwig  By Thomas G. and J. Ralph Orwig, Attys.

THE NORRIS PETERS CO., PHOTO-LITHO., WASHINGTON, D. C.

UNITED STATES PATENT OFFICE.

LOUIS FLEISCHMAN, OF DES MOINES, IOWA.

NUT-LOCK.

SPECIFICATION forming part of Letters Patent No. 590,412, dated September 21, 1897.

Application filed January 9, 1897. Serial No. 618,676. (No model.)

*To all whom it may concern:*

Be it known that I, LOUIS FLEISCHMAN, a citizen of the United States of America, residing at Des Moines, in the county of Polk and State of Iowa, have invented an Improved Nut-Lock, of which the following is a specification.

Heretofore bolts have been provided with a right and left handed screw-thread and two nuts having oppositely-threaded bores placed thereon and locked together by mechanical devices.

My object is to provide means whereby the same result is accomplished with but one screw-thread on the bolt and one screw-threaded nut and time and labor saved in applying to or removing the nuts from a bolt.

My invention consists in certain details of construction hereinafter set forth, pointed out in my claims, and illustrated in the accompanying drawings, in which—

Figure 1:
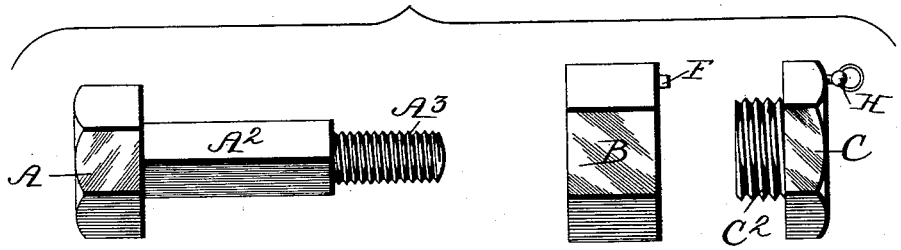
Figure 2:
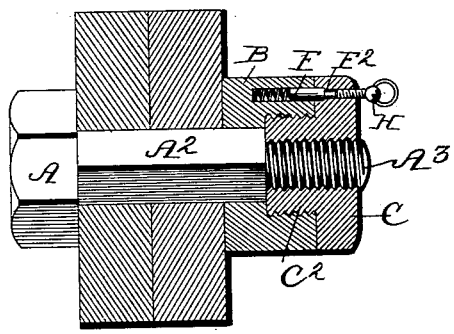
Figure 3:
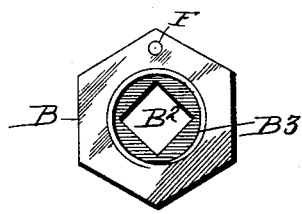
Figure 4:
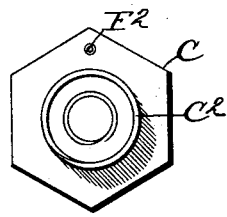

Figure 1 shows the bolt and nuts detached. Fig. 2 shows the bolt and nuts applied as in practical use. Figs. 3 and 4 are front views of the two nuts.

Referring to the accompanying drawings, the reference-letter A is used to indicate the head of the bolt, $A^2$ an angular formation on the central portion of the bolt, and $A^3$ a screw-threaded portion on the end of the bolt.

B indicates a nut or washer having an angular concentric opening $B^2$ and a circular concentric recess $B^3$ at the outer surface of the nut, preferably provided with an internal screw-thread.

C indicates the locking-nut hexagonal on its exterior and provided with an internal screw-thread adapted to engage the screw-threads on the bolt. On its inner surface is an annular projection $C^2$, adapted to enter the recess $B^3$ and provided with an external screw-thread to engage the screw-thread in the recess. This annular projection and mating recess serve to prevent the bolt from being broken or bent between the two nuts. For locking these nuts together I have provided a spring-actuated pin F in the exterior surface of the nut B and a coacting bore $F^2$ in the mating surface of the nut C. When the pin and bore are in alinement, the pin is forced into the bore and the nuts firmly locked together. To unlock the nuts, I screw a threaded pin H into the bore $F^2$ from the outer surface of the nut, and thus force the pin F from the bore, and as the outer nut is turned the pin will be kept from entering the bore.

In practical use the bolt is passed through the articles to be clamped together, the nut B placed on the angular part of the bolt in engagement with the objects to be clamped together, and the nut C finally screwed to the bolt and screwed up until in engagement with the nut C. It is obvious that this may be accomplished without turning the first nut, and at the same time when the second is locked to the first they cannot turn in unison.

Having thus described my invention, what I claim as new therein, and desire to secure by Letters Patent of the United States therefor, is—

1. An improved nut-lock, comprising a bolt having an angular central portion, and a screw-threaded end, a nut having an angular central opening, and a circular concentric screw-threaded opening at one end, a second nut internally screw-threaded, and having an annular screw-threaded flange to enter and engage the screw-threaded opening of the other nut, and means for locking the nuts together, substantially as and for the purposes stated.

2. An improved nut-lock comprising a bolt having an angular central portion and a screw-threaded end, a nut having an angular bore and a circular screw-threaded bore at one end thereof, a second nut internally screw-threaded and having one or more small bores on its inner face, an externally-screw-threaded annular projection on said nut and a spring-actuated pin in the first nut, substantially as and for the purposes stated.

LOUIS FLEISCHMAN.

Witnesses:
J. RALPH ORWIG,
THOMAS G. ORWIG.